(12) United States Patent
Park

(10) Patent No.: US 11,286,373 B2
(45) Date of Patent: *Mar. 29, 2022

(54) HYDROPHOBIC NANO SILICA MIXED THERMOPLASTIC HOT-MELT FILM WITH EXCELLENT ADHESIVE STRENGTH

(71) Applicant: Heedae Park, Busan (KR)

(72) Inventor: Heedae Park, Busan (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/237,935

(22) Filed: Apr. 22, 2021

(65) Prior Publication Data

US 2021/0238389 A1 Aug. 5, 2021

Related U.S. Application Data

(63) Continuation of application No. 16/733,746, filed on Jan. 3, 2020.

(30) Foreign Application Priority Data

Oct. 4, 2019 (KR) .................. 10-2019-0122818

(51) Int. Cl.
| | | |
|---|---|---|
| *C08K 9/06* | (2006.01) | |
| *C09J 7/35* | (2018.01) | |
| *C08K 3/36* | (2006.01) | |
| *C09J 11/06* | (2006.01) | |

(52) U.S. Cl.
CPC .............. *C08K 9/06* (2013.01); *C08K 3/36* (2013.01); *C09J 7/35* (2018.01); *C09J 11/06* (2013.01); *C08K 2201/005* (2013.01); *C08K 2201/011* (2013.01); *C09J 2431/00* (2013.01); *C09J 2475/00* (2013.01)

(58) Field of Classification Search
None
See application file for complete search history.

(56) References Cited

U.S. PATENT DOCUMENTS

| | | | |
|---|---|---|---|
| 3,716,502 A * | 2/1973 | Loew ................. | C08K 3/36 521/61 |
| 2004/0131527 A1* | 7/2004 | Gottschalk-Gaudig ..................... | G03G 9/09725 423/335 |

FOREIGN PATENT DOCUMENTS

| | | |
|---|---|---|
| BR | 112019023816-6 A2 | 6/2020 |
| CN | 102585485 A | 7/2012 |
| KR | 10-0865692 B1 | 10/2008 |
| KR | 10-2009-0117917 A | 11/2009 |
| KR | 10-2014-0147631 A | 12/2014 |
| KR | 10-2015-0005092 A | 1/2015 |
| KR | 10-1905957 B1 | 10/2018 |
| KR | 10-1915407 B1 | 11/2018 |
| KR | 10-1938526 B1 | 1/2019 |
| KR | 10-1971849 B1 | 4/2019 |
| WO | 2017208238 A1 | 12/2017 |

OTHER PUBLICATIONS

Brazil search report dated Feb. 9, 2021 of the Brazil Patent Application No. BR 102020011391-7, which corresponds to the above-identified application.

7.1 office action of Brazil search report dated Jun. 8, 2021 of the Brazil Patent Application No. BR 102020011391-7, which corresponds to the above-identified application.

* cited by examiner

*Primary Examiner* — Robert T Butcher

(74) *Attorney, Agent, or Firm* — Goldlocks Zone IP Law

(57) ABSTRACT

The present invention relates to a thermoplastic hot melt film having excellent adhesive strength in which hydrophobic nanosilica is mixed. The resin composition contains nanosilica having a particle size of 1 to 100 nm and containing hydrophobic functional groups on its surface in the range of 0.1 to 5 phr (Parts per Hundred Resin), and the nanosilica forms nanosilica aggregates with an average size of the aggregates is within 100~1200 nm. The thickness of the thermoplastic hot melt film is 0.02~0.3 mm. The thermoplastic hot melt film of the present invention is mixed with nanosilica containing hydrophobic functional groups, lipophilic, on the surface to improve dispersibility, strengthen water resistance, and increase tensile strength. The material cost is reduced while securing one adhesive strength and excellent durability, and multi-press molding is possible, which has the effect of increasing energy saving and productivity.

1 Claim, 2 Drawing Sheets

HYDROPHOBIC NANO SILICA MIXED THERMOPLASTIC HOT-MELT FILM WITH EXCELLENT ADHESIVE STRENGTH

CROSS-REFERENCE TO RELATED APPLICATION

The present application is a continuation application of U.S. patent application Ser. No. 16/733,746, filed on Jan. 3, 2020 and titled, which claims priority under 35 U.S.C. § 119 to Korean Patent Application No. 10-2019-0122818 filed on Oct. 4, 2019 in the Korean Intellectual Property Office, the disclosure of which is incorporated herein by reference in its entirety.

BACKGROUND OF THE INVENTION

Field of the Invention

The present invention relates to a thermoplastic hot melt film having excellent adhesive strength in which hydrophobic nanosilica is mixed, and more particularly, when a thermoplastic hot melt film is inserted and adhered between an adherend (for example, a fabric and a fabric), by using a thermoplastic hot melt film containing hydrophobic nanosilica, a thinner hot melt film ensures uniform adhesive strength and superior durability than conventional products, reduces material costs and enables multi-press molding, which can increase energy saving and productivity. In addition, the present invention relates to a thermoplastic hot melt film having excellent adhesive strength in which hydrophobic nanosilica is mixed to prevent an overflow phenomenon during the bonding process and to improve a weight and/or a feel of fabric products.

Background of the Invention

In recent years, as in all industries, various industries such as shoes, clothing, and bags are making efforts to reduce manufacturing costs. As part of this, attempts have been made to reduce or eliminate the sewing process, which requires a lot of manpower during the manufacturing process.

In this way, by replacing the sewing process, which takes up a considerable part of the product manufacturing cost with an adhesive process, it is intended to reduce the cost by increasing the output per person and shortening the process time.

In this adhesive process, a liquid adhesive is applied to an adherend (hereinafter, referred to as a 'fabric'), and the fabrics are adhered to each other in a state in which a solvent or moisture is volatilized through drying.

This adhesive process has an advantage over the sewing process in that the process time and the number of workers can be reduced. However, efforts to reduce manufacturing costs are not limited to this adhesive process, and a process has further been applied, in which fabrics are adhered to each other by heat pressing using a film-type hot-melt (hereinafter referred to as "thermoplastic hot-melt film") instead of using a liquid-state adhesive.

Thermoplastic hot-melt films are used in the footwear manufacturing field due to their environmentally friendly characteristics and convenience of use and for the purpose of reducing costs, and examples thereof include thermoplastic polyurethane (TPU) hot-melt films, polyamide hot-melt films, ethylene-vinyl acetate (EVA) hot-melt films, polyester hot-melt films, and the like. Among these films, TPU hot-melt films and EVA hot-melt films are mainly used. These thermoplastic hot-melt films have advantages in that they show good productivity due to their film extrusion workability, are environmentally friendly due to being free of solvent, and have excellent bonding strength and Selecting a material with a good touch feel is suitable to secure adhesion with various fabrics such as engineered mesh, sandwich mesh, lining fabric, etc.

However, since the conventional thermoplastic hot melt film is usually manufactured to a thickness of 0.2 mm or more in order to secure a stable adhesive force, when the hot melt film is sandwiched between fabrics and subjected to No-Sew Press, an overflow phenomenon frequently occurs. In addition, the fabric product is not only a lot of feeling that the overall weight is heavy, but also feels harder, and there is a disadvantage that does not meet the development trend of lighter weigh fabric.

In particular, the conventional hot-melt-films have the problem of having a thick film thickness of 0.2 mm or more. In addition to this problem, when no-sew pressing is performed in a state in which the thermoplastic hot-melt film is inserted between fabrics, a problem arises in that an excessive amount of the hot-melt film flows into the fabric having a relatively large hole diameter and the hot-melt film is not present at the adhesive interface, eventually causing adhesive failure.

Namely, if a fabric having a relatively large hole diameter is adhered to a fabric having a relatively small hole diameter, a fabric having a relatively high yarn density is adhered to a fabric having a relatively low yarn density, or different kinds of fabrics are adhered to each other by a hot-melt film, the hot-melt film is excessively penetrated into one side of the fabrics by heat and pressure. This means that, the hot-melt film melts and flows into the fabric having a relatively large hole diameter or a relatively low yarn density, and thus the hot-melt film does not remain on the remaining adhesive interface of the fabric.

Korean Patent No. 10-0865692 has disclosed a hot melt film comprising: a bottom layer made of any one of a release film or release paper; a liquid resin layer of a solvent type applied to an upper surface of the bottom layer; and a non-solvent type hot-melt film layer applied to the upper surface of the resin layer.

In order to improve the drawback of the above invention, through research such as Korean Patent Publication Nos. 10-2014-0147631 and 10-2015-0005092, method for producing a thermoplastic polyurethane hot melt film has been developed by the inventor of the present invention, Heedae Park.

As a result of numerous trials and errors, using polyester polyols having a number average molecular weight of 4,000 or more, aliphatic isocyanates and amines are used as chain extenders, and ethoxylated polypropylene oxide is used as a surfactant, in addition, using rosin as tackifier. Further, a method of producing a polyurethane hot melt film having a pressure-sensitive adhesive function was developed by coating a water-soluble polyurethane adhesive polymerized by reacting these with a thickness of 20 μm or less on a hot melt film.

Also reactive hot melt polyurethane resin composition containing nano silica, which include; Dimethylpyrazole (DMP) type isocyanate blocking agent; and 2,4-pentanedione is developed. The technologies are disclosed Korean Patents 10-1905957 and 10-1915407, respectively.

In addition, Korean Patent No. 10-1253028 invented by the inventor of the present invention, by using a thermoplastic hot melt film for shoes, the hot melt film comprising a resin, wherein the reason composition is any one resin selected from thermoplastic polyurethane (TPU), ethylene vinyl acetate (EVA), polyamide (Polyamide), polyester (Polyester), the resin includes 0.1 to 5.0 phr nanosilica, the thermoplastic hot melt film does not biased to one side of the fabric by heat and pressure even when the yarn density of fabric is high or low during no-sew press or the diameter of fabric weaving hole is big or small. It has been found that the adhesive force of the hot melt film can be increased by allowing it to be uniformly distributed on the fabric surface without melting.

Furthermore, in the present invention, as a result of an intensive research on the patent, by mixing surface-modified hydrophobic nano-silica as the used nano-silica, it is possible to manufacture a hot melt film of a thinner thickness. In addition to the advantages of the patent, material cost and energy savings, multi-press molding, and productivity is improved In addition, the fabric to which this is applied is light and overall feel is soft, as well as to fully improve the overflow problem that was a problem in the adhesion process to reach the present invention by confirming that the quality of the product can be improved.

PATENT DOCUMENTS

Patent Document 1: Korean Patent No. 10-0865692 (Hot-melt fil and the manufacture method thereof; issued on Oct. 28, 2008);
Patent Document 2: Korean Patent Application Publication No. 10-2014-0147631 (entitled "Method for manufacturing thermoplastic polyurethane hot-melt film and thermoplastic hot-melt film manufactured by the method"; published on Dec. 30, 2014);
Patent Document 3: Korean Patent Application Publication No. 10-2015-0005092 (entitled "Thermoplastic polyurethane hot-melt film; published on Jan. 14, 2015);
Patent Document 4: Korean Patent No. 10-1905957. (entitled "Polyurethane hot-melt film and the manufacture method; Published on Oct. 8, 2018);
Patent Document 5: Korean Patent No. 10-1915407. (entitled "A composition of hot melt film; Published on Nov. 5, 2018);
Patent Document 6: Korean Patent No. 10-1938526. (entitled "Thermoplastic hot-melt film with excellent adhesive strength mixed with nano silica; Published on Jan. 15, 2019).

DISCLOSURES OF THE PRESENT INVENTION

Problems to be Solved

An object of the present invention is a thinner, 0.02 to 0.3 mm, hot melt film containing nanosilica containing hydrophobic functional groups on its surface, which reduces material costs while ensuring uniform adhesive strength and superior durability than conventional products.

In addition, the present invention provides a thermoplastic hot melt film having excellent adhesive strength in which hydrophobic nanosilica is mixed, which enables multi-press molding to increase energy saving and productivity.

Another object of the present invention is to prevent the overflow phenomenon caused by the adhesive process by the hot melt film inserted between the fabrics excellent adhesion performance, and also to improve the weight and texture of the hot melt film applied fabric products. The present invention provides a thermoplastic hot melt film having excellent adhesion with hydrophobic nanosilica.

Solution to Solve Problems

A thermoplastic hot melt film with a hydrophobic nano silica having excellent adhesion according to the present invention, the thermoplastic hot melt film including any one or more resin compositions selected from thermoplastic polyurethane (TPU) and ethylene vinyl acetate (EVA), wherein the resin composition contains a nano-silica containing a hydrophobic functional group on the surface thereof in the range of 0.1~5 phr (Parts per Hundred Resin), the thickness of the thermoplastic hot melt film is 0.02~0.3 mm, and the nanosilica has a particle size of 1~100 nm.

According to a preferred embodiment of the present invention, the hydrophobic functional group contained on the surface of the nanosilica is any one or more selected from alkyl group, dimethyl group, trimethyl group, dimethyl siloxane group, methacryl group.

The nanosilica may form nanosilica aggregates, and an average size of an aggregated nanosilica is in a range of 100 to 1200 nm.

Effects of the Invention

There are several effects according to aspects of the present invention. The thermoplastic hot melt film of the present invention is mixed with a nanosilica containing a hydrophobic, lipophilic, functional group on the surface to improve dispersibility and reinforced water resistance. In addition, as the tensile strength is increased, even a thinner hot melt film ensures uniform adhesive strength and excellent durability than that of conventional products, reduces material costs, enables multi-press molding, and saves energy and increases productivity.

Thermoplastic hot melt film may be evenly distributed on the surface of the fabric without biasing and melting into one side of the fabric by heat and pressure even if the yarn density of fabric is high or low during no-sew press or the diameter of fabric weaving hole is big or small. Thus, it has been found that the adhesive force of the Thermoplastic hot melt film can be maximized by uniformly distributing on the fabric surface.

There are some advantages according to aspects of the present invention, for examples, not only prevents the fabric from becoming hard but also prevents the overflow phenomenon caused by the hot melt film inserted between the fabrics during the bonding process, thereby the bonding performance can be improved. In addition, the fabric to which the hot melt film is applied is light and overall feel is soft.

DETAILED DISCLOSURES

Figure 1:
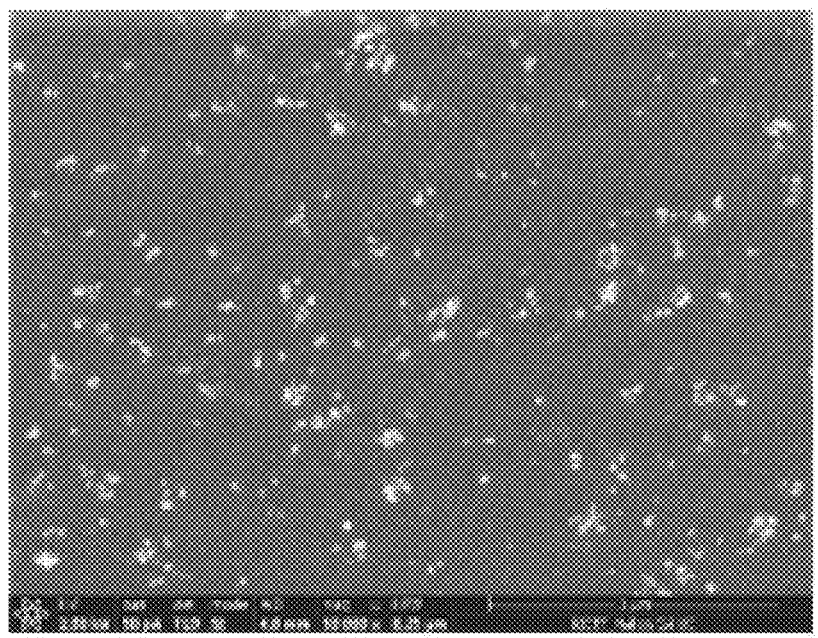
FIG. 1 shows a surface of a 0.15 mm thick TPU hot melt film containing a primary particle size of about 20 nm and 1 phr of hydrophobic nanosilica containing a dimethyl group as a hydrophobic functional group measured by a scanning electron microscope (SEM)(magnification: 50,000×).

Hereinafter will be described with respect to the hydrophobic nanosilica mixed thermoplastic hot-melt film excellent in adhesion strength according to the present invention, which is illustrated to the extent that a person skilled in the art can easily practice the invention. It is intended to, but does not imply limit the technical spirit and scope of the present invention.

The term 'nanosilica' generally used in the present invention refers to silica particles of 100 nanometers (nm) or less having a primary particle size smaller than a micro (μm) unit, and include 'hydrophobic functional groups on the surface'. Nanosilica, hydrophobic nanosilica, 'means that a hydrophobic functional group is introduced to part or all of the surface of the nanosilica particles.

Conventional nanosilica particles are hydrophilic on the surface, the nanosilica of the present invention is excellent in dispersibility because the hydrophobic functional group (lipophilic) is introduced through a separate surface treatment or surface modification to make the surface hydrophobic. The dispersibility is excellent and the water resistance of the thermoplastic hot melt film itself is reinforced, thereby increasing the tensile strength.

In addition, the term 'nano silica aggregate used in the present invention refers to a state in which about 70% or more of the nano silica primary particles are strongly aggregated together by physical and chemical action.

The nanosilica aggregate is composed of a plurality of primary particles, and it is difficult to further separate the nanosilica aggregate into smaller entities, nanosilica particles in the resin composition for the hot melt film.

Basically, the thermoplastic hot melt film having excellent adhesive strength in which the hydrophobic nanosilica is mixed is used in the thermoplastic hot melt film composed of at least one resin composition selected from thermoplastic polyurethane (TPU) and ethylene vinyl acetate (EVA).

The resin composition contains 0.1 to 5 phr (Parts per Hundred Resin) of the nano-silica containing a hydrophobic functional group on the surface, the thickness of the thermoplastic hot melt film is 0.02~0.3 mm The nanosilica has a primary particle size of 1~100 nm.

The hydrophobic functional group contained in the surface of the nanosilica is at least one selected from alkyl group, dimethyl group, trimethyl group, dimethyl siloxane group, and methacryl group.

The nanosilica forms a nanosilica aggregate and has an average aggregate size in a range between 100 to 1200 nm.

In the present invention, when manufacturing a thermoplastic hot melt film, by inserting a nano-silica containing a hydrophobic functional group on the surface of the thermoplastic hot melt film, the hot melt film is inserted between fabrics when bonding fabrics by a No-Sew Press, thereby thermoplastic hot melt including a nano-silica containing a hydrophobic functional group that improves adhesion by allowing the hot melt film to be distributed evenly on the surface of the fabric without being flowed into one side of the fabric due to heat and pressure when the density of the yarn is high or low, or the size of the weaving hole is large or small.

The term 'evenly distributed on the surface of the fabric' means that, during the No-Sew press operation, the thermoplastic hot melt film does not flow into one side where the density of the yarn is high or the size of the fabric weaving hole is large, based on the thermoplastic hot melt film, but about evenly distributes about ⅓ of the thermoplastic hot melt film is on an upper part fabric, a bottom part fabric, and a place between the upper part fabric and the bottom part fabric, adhesive interface, respectively.

Thus, the thermoplastic hot melt film of the present invention is uniformly distributed on the surface of the fabric to improve an adhesion force and of course no problem in an adhesive strength. It is possible to secure the adhesive strength or more than the strength equivalent to the conventional hot melt film even if manufactured to a thickness thinner than the conventional thermoplastic hot melt film thickness, 0.1 mm or more.

The reason is that the dispersibility of the nanosilica is improved if the hydrophobic functional group is introduced to the surface of the nanosilica particles mixed thermoplastic hot melt film of the present invention, and the hydrophobic action enhances the water resistance of the thermoplastic hot melt film and increases the tensile strength. In the molding process such as drawing, it is confirmed that the cutting phenomenon which may be caused by moisture is reduced and the physical properties such as molding properties are improved.

Hydrophobic functional groups that can be introduced to the surface of the nano-silica particles may be any one of an alkyl group, dimethyl group, trimethyl group, dimethyl siloxane group, methacryl group and the like.

For example, the nanosilica particles used in the thermoplastic polyurethane yarn of the present invention may include a dimethyl group on the surface of the nanosilica particles by treating the nanosilica obtained by adjusting the temperature and pressure in the fumed silica manufacturing process with an organosilane compound.

The nanosilica particles having the hydrophobic functional group introduced therein preferably have an OH group density of 1.0 OH/nm$^3$ or less.

The density of the OH group can be measured by a known method, such as measuring the molar absorbance, ε, of the OH stretching oscillation band in the organosilanol group at 3750 cm$^{-1}$ using IR spectroscopy by reacting nanosilica particles and lithium aluminium hydrohydride with hydrophobic actuators.

The nanosilica particles into which the hydrophobic functional groups are introduced are present in the nanosilica aggregate state, and the hydrophobic nanosilca particles are dispersed in the aggregate state, which is difficult to separate separately in the resin composition for the hot melt film according to an aspect of the present invention. Preferably, the aggregates have an aggregate size of 100 to 1200 nm, more preferably have an aggregate size of 200 to 500 nm.

If the size of the hydrophobic nanosilica aggregate is 100 nm or more, nanosilica is well dispersed. However, if it exceeds 1200 nm, the thickening effect is reduced, and many defects such as cutting occur in the molding process using a T-die extruder.

The size of the nanosilica aggregate indicates the length in a long axis direction of the nanosilica aggregate, and can often be measured using a transmission electron microscope or the like.

Figure 2:
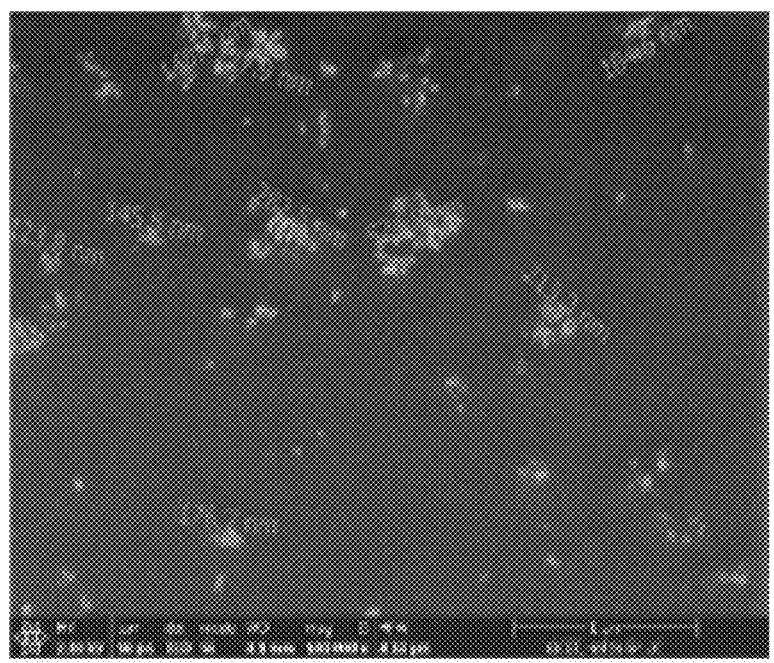
FIG. 2 shows a surface of a 0.15 mm thick TPU hot melt film containing a primary particle size of about 20 nm and 1 phr of hydrophobic nanosilica containing a dimethyl group as a hydrophobic functional group measured by the SEM (magnification: 100,000×).

As an example, as shown in FIG. 1 shows a surface of a 0.15 mm thick TPU hot melt film containing a primary particle size of about 20 nm and 1 phr of hydrophobic nanosilica containing a dimethyl group as a hydrophobic functional group measured by a SEM)(magnification: 50,000×). In addition, FIG. 2 shows a surface of a 0.15 mm thick TPU hot melt film containing a primary particle size of about 20 nm and 1 phr of hydrophobic nanosilica containing a dimethyl group as a hydrophobic functional group measured by SEM (100,000×).

It is shown that the nanosilica in the TPU resin is well dispersed in a form of nanosilica aggregates having a certain size.

As described above, in the present invention to prepare a hot melt film mixing nano-silica containing a hydrophobic functional group on the surface in order to improve the adhesion and formability of the thermoplastic hot melt film, based on the resin composition for the hot melt film, it shows that that the hot melt film mixing the hydrophobic nanosilica was contained in the range of 0.1 to 5 phr (Parts per Hundred Resin) and the thickness of the film in a range of 0.02 mm to 0.3 mm, can be prepared.

As a method of mixing the hydrophobic nanosilica, in the case of TPU resin, when polymerizing resin, nanosilica is mixed with raw materials and then polymerized to prepare a resin for thermoplastic hot melt film or a master batch using nanosilica is prepared.

In the case of EVA resin, it is usually convenient to prepare a master batch using hydrophobic nanosilica, and then mix it with each resin to prepare a resin for thermoplastic hot melt film in the manufacturing process.

According to an aspect of the present invention, mixing hydrophobic nanosilica having a size of 100 nm or less to a thermoplastic hot melt film, it shows that even if a small amount, 0.1 phr (parts per hundred resin) or more is added, the adhesion is improved.

However, if the content of the nanosilica exceeds 5.0 phr, the surface of the thermoplastic hot melt film was opaque, and rather, the adhesion was decreased, and as time passed, the side effects of blooming occurred on the surface of the hot melt film.

As described above, when manufacturing a thermoplastic hot melt film, a nano-silica containing hydrophobic functional groups, lipophilic, is mixed on the surface of thermoplastic hot melt film to improve dispersibility and water resistance to increase tensile strength, thereby making the hot melt film thinner. As a result, while maintaining uniform adhesive strength and excellent durability than conventional products, energy saving and multi-press molding are possible while decreasing material cost, thereby increasing productivity according to aspect of the present invention.

In addition, when a No-Sew Press, even when the yarn tissue density of the fabric is high or low or the diameter of the fabric weaving hole is large or small, the hot melt film is evenly distributed on the surface of the fabric formed by heat and pressure without being flown into one side of the fabric.

It can maximize the adhesive strength of the hot melt film, prevent the fabric from becoming hard and improve the overflow phenomenon caused by the hot melt film inserted between the fabrics. In addition, light weight and soft texture of the fabric product to which the hot melt film is applied can be realized.

On the other hand, the thermoplastic polyurethane (TPU) used in the present invention is obtained by polymerizing polyol and isocyanate as raw materials and low molecular weight glycol as a chain.

Examples of polyols used herein may include polyester glycols, polyether glycols, polycaprolactones, and the like. Examples of isocyanates may include aromatic isocyanates, aliphatic isocyanates, and the like. Examples of low molecular weight glycols may include 1,4-butanediol and the like.

In addition, ethylene vinyl acetate (EVA), polyamide, polyester resin, etc. may be used as the material for the thermoplastic hot melt film.

However, it is concluded that the use of a single or composite resin composition selected from thermoplastic polyurethane (TPU) and ethylene vinyl acetate (EVA) is more effective for kneading, dispersibility, and adhesion performance with hydrophobic nanosilica according to aspects of the present invention.

Hereinafter, a method of manufacturing a thermoplastic hot melt film mixing nanosilica containing a hydrophobic functional group on its surface will be described in detail according to aspects of the present invention.

That is, a method for producing a TPU hot melt film by mixing hydrophobic nanosilica with raw materials, isocyanate, polyol, glycol, used in the TPU polymerization and then polymerizing and a method of making a hot melt film by making a master batch using hydrophobic nanosilica and mixing it by content in a TPU resin or EVA resin will be described in detail.

EXAMPLE 1

TPU hot melt film production method according to aspects of the present invention is a method for producing a mixture by mixing it with a raw material used in the polymerization of TPU pellet, the production method may include the following five steps.

In the first step, 100 nm or less nanosilica was treated with dimethyl dichlorosilane to prepare hydrophobic nanosilica particles having a primary particle size of about 20 nm and including dimethyl groups as hydrophobic functional groups on the surface.

The second step is to prepare a raw material for the conventional TPU pellet polymerization, in particular polyol, isocyanate, short chain glycol is prepared.

In the third step, any one of the raw materials shown in step 2 is selected to add hydrophobic nanosilica, or hydrophobic nanosilica is added to the raw materials and kneaded. At this time, the temperature is 80 to 100° C. and the stirring speed is preferably about 20 to 30 rpm.

In the fourth step, the raw material sufficiently mixed with the hydrophobic nanosilica and the remaining raw material are simultaneously introduced into the reactive extruder or the raw material sufficiently mixed with the hydrophobic nanosilica is simultaneously introduced into the reactive extruder and polymerized into a TPU pellet.

The fifth step is to dry and mature the TPU pellets polymerized in step 4 to prepare a resin for the TPU hot melt film mixed with hydrophobic nanosilica, and then the resin in the form of a film in a conventional T-die extruder Extrusion to or coating the resin on a conventional release paper to prepare a TPU hot melt film containing a hydrophobic nanosilica to be implemented in the present invention.

EXAMPLE 2

Next, a method of preparing a hot melt film by preparing a masterbatch using a hydrophobic nanosilica, and mixing the masterbatch into a TPU resin or EVA resin by content according to the present invention will be described in detail.

First, the resins presented above are weighed by content. At this time, the content of the hydrophobic nanosilica is preferably in consideration of dispersibility such that the maximum does not exceed 40%.

Next, the hydrophobic nanosilica and the resin was added to a conventional kneader, kneaded at a speed of 20 to 30 rpm at a temperature of 100 to 120° C., and cooled, and pulverized so that the diameter was less than 10 mm, and then put into a conventional twin extruder (not shown). At this time, the temperature of the twin screw extruder is maintained at a temperature of 150 to 200° C.

When the compounded resin in the twin screw extruder is made into pellets while being poured into a cooling water at a temperature of 15 to 20° C., the resin becomes a masterbatch to be obtained according to aspects of the present invention. The masterbatch is mixed by content in TPU resin or EVA resin) to prepare a resin for hot melt film.

Then, the resin is introduced into a general T-die extruder to prepare a hot melt film to be implemented according to an aspect of the present invention.

That is, the resin for hot-melt film prepared by mixing the master batch and the resin containing the hydrophobic nanosilica is extruded in a film form in a conventional T-die extruder or alternatively, when the resin is coated on a conventional release paper, a hot melt film including a hydrophobic nanosilica to be implemented is prepared according to aspects of the present invention.

Experimental Example 1

In order to demonstrate the effect on the hydrophobic nanosilica mixed TPU hot melt film prepared in example 1 will be described in detail the experimental results for the adhesion test.

Below, engineered and sandwich meshes mainly used for an upper and lining fabrics mainly used for lining are used.

In addition, the adhesive structure and the press working conditions are for the engineered mesh or sandwich mesh corresponding to the upper, an outer material, and the TPU hot melt film is inserted between the lining fabric corresponding to the lining.

And then press work was carried out at 60 kgf pressure for 30 seconds at 130° C., TPU hot melt film was used as a conventional TPU hot melt film and a TPU hot melt film mixed by the hydrophobic nanosilica content, respectively.

Table 2 below shows an adhesion test data by thickness/hydrophobic nanosilica content of TPU hot melt film, and the part "-" without numerical value in the adhesive strength (kgf/cm$^2$) field of the engineered mesh and the sandwich mesh, it means that it has been destroyed due to a good adhesive strength where Tfb is a Flow Beginning Temperature and MI is a Melt Index.

TABLE 2

| No. | thickness (mm) | Nano Si (phr) | engineered mesh (kgf/cm$^2$) | sandwich mesh (kgf/cm$^2$) | Tfb (° C.) | MI (g/10 min) |
|---|---|---|---|---|---|---|
| 1 | 0.02 | 0 | 0.78/0.75/0.68 | 0.75/0.76/0.75 | 118.7 | 10.4 |
| 2 | 0.05 | 0 | 1.05/1.00/1.09 | 1.12/1.07/1.06 | | |
| 3 | 0.075 | 0 | 1.93/1.73/1.6 | 2.22/2.24/1.92 | | |
| 4 | 0.25 | 0 | 3.15/3.23/3.24 | 3.21/3.05/3.08 | | |
| 5 | 0.3 | 0 | 3.47/3.52/3.60 | 3.55/3.61/3.49 | | |
| 6 | 0.02 | 0.1 | 0.86/0.88/0.88 | 0.84/0.86/0.84 | 118.2 | 9.8 |
| 7 | 0.05 | 0.1 | 1.25/1.29/1.31 | 1.24/1.28/1.19 | | |
| 8 | 0.075 | 0.1 | 2.05/2.17/2.20 | 2.34/2.36/2.33 | | |
| 9 | 0.25 | 0.1 | 3.57/3.74/3.64 | 3.55/3.48/3.58 | | |
| 10 | 0.3 | 0.1 | 3.88/3.94/4.11 | 3.91/3.82/3.89 | | |
| 11 | 0.02 | 0.3 | 0.82/0.83/0.91 | 0.87/0.92/0.85 | 119.4 | 10.1 |
| 12 | 0.05 | 0.3 | 1.28/1.32/1.30 | 1.18/1.22/1.25 | | |
| 13 | 0.075 | 0.3 | 2.15/2.18/2.21 | 2.31/2.37/2.31 | | |
| 14 | 0.25 | 0.3 | 3.76/3.85/3.91 | 3.74/3.64/3.67 | | |
| 15 | 0.3 | 0.3 | 3.95/4.06/3.88 | 3.85/3.93/3.85 | | |
| 16 | 0.02 | 0.5 | 0.84/0.89/0.92 | 0.87/0.89/0.92 | 118.5 | 10.7 |
| 17 | 0.05 | 0.5 | 1.31/1.28/1.36 | 1.22/1.20/1.23 | | |
| 18 | 0.075 | 0.5 | 2.13/2.17/2.20 | 2.39/2.34/2.41 | | |
| 19 | 0.25 | 0.5 | 3.88/3.96/4.10 | 3.84/3.79/3.85 | | |
| 20 | 0.3 | 0.5 | 4.63/4.82/— | 4.21/4.55/4.62 | | |
| 21 | 0.02 | 0.7 | 0.93/0.94/0.90 | 0.89/0.92/0.87 | 118.2 | 10.5 |
| 22 | 0.05 | 0.7 | 1.32/1.43/1.30 | 1.27/1.26/1.22 | | |
| 23 | 0.075 | 0.7 | 2.31/2.28/2.30 | 2.35/2.37/2.40 | | |
| 24 | 0.25 | 0.7 | 3.95/3.92/3.91 | 4.00/3.92/3.90 | | |
| 25 | 0.3 | 0.7 | 4.97/—/5.22 | —/4.62/4.77 | | |
| 26 | 0.02 | 1 | 0.85/0.95/0.91 | 0.88/0.86/0.90 | 117.8 | 11.1 |
| 27 | 0.05 | 1 | 1.39/1.42/1.36 | 1.25/1.18/1.22 | | |

TABLE 2-continued

| No. | thickness (mm) | Nano Si (phr) | engineered mesh (kgf/cm$^2$) | sandwich mesh (kgf/cm$^2$) | Tfb (° C.) | MI (g/10 min) |
|---|---|---|---|---|---|---|
| 28 | 0.075 | 1 | 2.21/2.14/2.39 | 2.42/2.52/2.42 | | |
| 29 | 0.25 | 1 | 4.21/4.02/— | 4.05/3.86/3.99 | | |
| 30 | 0.3 | 1 | 5.28/—/— | —/4.89/— | | |
| 31 | 0.02 | 2 | 1.01/0.95/0.90 | 0.91/0.94/0.89 | 119.2 | 11.5 |
| 32 | 0.05 | 2 | 1.40/1.35/1.37 | 1.26/1.22/1.30 | | |
| 33 | 0.075 | 2 | 2.26/2.31/2.35 | 2.41/2.34/2.30 | | |
| 34 | 0.25 | 2 | 4.36/4.46/4.03 | 3.96/4.15/4.06 | | |
| 35 | 0.3 | 2 | 5.13/5.56/— | 5.02/4.95/— | | |
| 36 | 0.02 | 3 | 0.92/0.92/1.01 | 0.93/0.84/0.96 | 121.4 | 10.7 |
| 37 | 0.05 | 3 | 1.35/1.33/1.43 | 1.30/1.26/1.27 | | |
| 38 | 0.075 | 3 | 2.22/2.36/2.27 | 2.35/2.44/2.37 | | |
| 39 | 0.25 | 3 | 4.07/4.33/4.28 | 3.88/4.02/3.99 | | |
| 40 | 0.3 | 3 | —/—/6.02 | 5.17/5.23/— | | |
| 41 | 0.02 | 5 | 1.11/1.05/0.96 | 0.94/0.95/0.94 | 123.1 | 8.9 |
| 42 | 0.05 | 5 | 1.41/1.35/1.42 | 1.32/1.27/1.26 | | |
| 43 | 0.075 | 5 | 2.23/2.18/2.34 | 2.31/2.16/2.24 | | |
| 44 | 0.25 | 5 | 4.17/3.97/4.21 | 3.85/3.95/4.15 | | |
| 45 | 0.3 | 5 | 5.01/4.97/5.20 | 4.96/4.88/4.87 | | |

As shown in the experimental results shown in Table 2, when the engineered mesh and the sandwich mesh of an outer material, an upper are bonded to the lining fabric of a lining material, TPU Hot-Melt Films, No. 6-45, according to aspects of the present, it shows an about 10% increases in adhesion strength over the conventional TPU Hot-Melt Films, No. 1 to 5, manufactured under the same conditions, and thus the durability is also excellent according to aspects of the present invention.

As a result of applying the hydrophobic nano silica by content as described above, the adhesion test was performed on the same fabric by thickness, and when 0.1 phr and 0.3 phr were added, the adhesive strength was somewhat unstable at 0.02 mm and 0.05 mm, but the adhesive strength was improved than that of conventional method.

On the other hand, in the case of the hydrophobic nanosilica content of 3 phr, it shows that that the adhesive strength was somewhat decreased as the content of the nanosilica was increased. But, as a result of increasing the content, the adhesive strength was slightly decreased up to 5 phr, but there was no problem in the adhesive strength.

However, when the content of the hydrophobic nanosilica is more than 5 phr, it was confirmed that there is a problem that the adhesive strength falls, and the transparency and blooming of the TPU hot melt film occurred.

Therefore, the purpose and effect of this invention can be realized in the manufacture of TPU hot-melt films if the contents of hydrophobic nanosilica are 0.1 to 5.0 phr (Parts per Hundred Resin) and the film thickness is 0.02 to 0.3 mm.

For reference, the thickness of the TPU hot melt film most commonly used by shoe companies is about 0.2 mm, but in the future, clothing companies and bag companies will use a hot melt film of 0.1 mm or less to improve the product weight and texture of their products.

Depending on the nature of the conventional TPU hot-melt film, it reacts sensitively to heat and pressure during no-sew presses, and the flow rate increases rapidly, so depending on the fabric structure, does not remain in the adhesive layer, and the adhesive performance is not good.

It reacts sensitively to heat and pressure during the press work (No-Sew Press) according to the properties of the conventional TPU hot melt film, so that the flow rate is rapidly increased, the conventional TPU hot melt film does not remain in the adhesive layer, and the adhesive layer performance is not good. The part that does not come out like the nano-silica.

As shown an aspect of the present invention, by mixing nanosilica, especially hydrophobic nanosilica, the TPU hot-melt film stays at a certain amount on the adhesive surface, thereby improving adhesion even in thin thickness.

As such, when the hydrophobic nanosilica is used as a copolymer with the TPU, the internal chemical bonding and the Van der Waals bonding of the urethane resin are increased, so that the rheology and cohesion characteristics of the TPU are increased. This increases the adhesive strength is stronger and can eventually increase the adhesive strength structurally.

By using the hydrophobic nanosilica in the TPU hot melt film, the same adhesive performance can be realized with a thinner thickness than the conventional TPU hot melt film, thereby reducing the cost of the resin for the TPU hot melt film and hot melt inserted between fabrics during the bonding process, it improves the overflow phenomenon of the film, and also has various advantages such as excellent softness of the bonded fabric and light weight of the product.

Experimental Example 2

Table 3 below presents the experimental results for the adhesion test in order to prove the effect on the EVA hot melt film mixed with the hydrophobic nanosilica prepared in Example 2 above.

In the following, the press work was performed in the same manner as in Experimental Example 1, and as the EVA hot melt film, a general EVA hot melt film and an EVA hot melt film with hydrophobic nanosilica were used, respectively.

Table 3 below shows the adhesion test data for each thickness/hydrophobic nanosilica content of the EVA hot melt film, where Tfb represents the Flow Beginning Temperature and MI represents the Melt Index.

Table 3

| No | thickness (mm) | nanoSi (phr) | Engineered mesh (kgf/cm$^2$) | Sandwiched mesh (kgf/cm$^2$) | Tfb (° C.) | MI (g/10 min) |
|---|---|---|---|---|---|---|
| 1 | 0.02 | 0 | 0.02/0.05/0.07 | 0.05/0.02/0.02 | 114.1 | 13.1 |
| 2 | 0.05 | 0 | 0.23/0.26/0.23 | 0.28/0.26/0.22 | | |
| 3 | 0.075 | 0 | 0.38/0.36/0.37 | 0.40/0.38/0.27 | | |
| 4 | 0.25 | 0 | 0.73/0.77/0.82 | 0.85/0.83/0.94 | | |
| 5 | 0.3 | 0 | 0.81/0.76/0.83 | 0.86/0.91/0.94 | | |
| 6 | 0.02 | 0.1 | 0.11/0.12/0.08 | 0.08/0.09/0.12 | 113.6 | 12.8 |
| 7 | 0.05 | 0.1 | 0.31/0.32/0.31 | 0.29/0.33/0.32 | | |
| 8 | 0.075 | 0.1 | 0.44/0.46/0.45 | 0.47/0.46/0.43 | | |
| 9 | 0.25 | 0.1 | 0.98/1.12/1.05 | 1.35/1.21/1.13 | | |
| 10 | 0.3 | 0.1 | 1.27/1.33/1.32 | 1.22/1.35/1.29 | | |
| 11 | 0.02 | 0.3 | 0.12/0.11/0.13 | 0.09/0.11/0.11 | 113.9 | 12.5 |
| 12 | 0.05 | 0.3 | 0.33/0.32/0.33 | 0.30/0.33/0.32 | | |
| 13 | 0.075 | 0.3 | 0.46/0.47/0.51 | 0.50/0.48/0.47 | | |
| 14 | 0.25 | 0.3 | 1.38/1.43/1.46 | 1.54/1.46/1.48 | | |
| 15 | 0.3 | 0.3 | 1.52/1.56/1.55 | 1.75/1.77/1.78 | | |
| 16 | 0.02 | 0.5 | 0.13/0.14/0.16 | 0.14/0.13/0.14 | 114.5 | 13.5 |
| 17 | 0.05 | 0.5 | 0.36/0.36/0.35 | 0.35/0.34/0.35 | | |
| 18 | 0.075 | 0.5 | 0.56/0.58/0.57 | 0.59/0.60/0.59 | | |
| 19 | 0.25 | 0.5 | 1.54/1.57/1.69 | 1.75/1.69/1.68 | | |
| 20 | 0.3 | 0.5 | 1.85/1.96/1.88 | 1.87/1.94/1.95 | | |
| 21 | 0.02 | 0.7 | 0.15/0.17/0.20 | 0.14/0.15/0.14 | 113.8 | 12.7 |
| 22 | 0.05 | 0.7 | 0.35/0.36/0.33 | 0.35/0.36/0.36 | | |
| 23 | 0.075 | 0.7 | 0.60/0.58/0.59 | 0.60/0.61/0.62 | | |
| 24 | 0.25 | 0.7 | 1.76/1.72/1.85 | 1.88/1.75/1.83 | | |
| 25 | 0.3 | 0.7 | 2.03/2.15/1.95 | 1.99/2.03/2.00 | | |
| 26 | 0.02 | 1 | 0.24/0.18/0.21 | 0.15/0.14/0.15 | 114.9 | 13.1 |
| 27 | 0.05 | 1 | 0.38/0.36/0.37 | 0.40/0.37/0.37 | | |
| 28 | 0.075 | 1 | 0.62/0.61/0.58 | 0.60/0.65/0.66 | | |
| 29 | 0.25 | 1 | 1.88/1.69/1.94 | 1.96/1.82/1.91 | | |
| 30 | 0.3 | 1 | 2.04/2.06/1.98 | 2.07/2.04/2.00 | | |
| 31 | 0.02 | 2 | 0.22/0.23/0.21 | 0.15/0.17/0.16 | 115.2 | 12.2 |
| 32 | 0.05 | 2 | 0.38/0.37/0.40 | 0.41/0.43/0.44 | | |
| 33 | 0.075 | 2 | 0.63/0.65/0.60 | 0.65/0.62/0.64 | | |
| 34 | 0.25 | 2 | 1.89/2.04/2.01 | 1.98/1.92/2.01 | | |
| 35 | 0.3 | 2 | 2.06/2.15/2.08 | 2.17/2.22/2.13 | | |
| 36 | 0.02 | 3 | 0.19/0.22/0.22 | 0.16/0.16/0.15 | 114.7 | 12.5 |
| 37 | 0.05 | 3 | 0.41/0.38/0.42 | 0.42/0.40/0.44 | | |
| 38 | 0.075 | 3 | 0.65/0.64/0.68 | 0.60/0.59/0.67 | | |
| 39 | 0.25 | 3 | 2.06/2.05/1.99 | 1.96/1.95/2.04 | | |
| 40 | 0.3 | 3 | 2.11/2.07/2.17 | 2.22/2.27/2.11 | | |
| 41 | 0.02 | 5 | 0.17/0.19/0.20 | 0.15/0.15/0.14 | 115.8 | 11.7 |
| 42 | 0.05 | 5 | 0.39/0.40/0.41 | 0.38/0.41/0.37 | | |
| 43 | 0.075 | 5 | 0.62/0.59/0.60 | 0.58/0.64/0.57 | | |
| 44 | 0.25 | 5 | 2.06/2.11/1.96 | 1.96/1.98/2.02 | | |
| 45 | 0.3 | 5 | 2.07/2.05/2.15 | 2.11/2.16/2.20 | | |

As shown in the experimental results shown in Table 3, when the engineered mesh and sandwich mesh of the outer material is bonded to the lining fabric of the lining material, EVA hot melt film, No. 6~45, according to the present invention can be seen that the adhesive strength is increased by about 30% or more than the conventional EVA hot melt film (No 1~5) prepared under the same conditions, as a result, it shows that the durability is also excellent according to aspect of the present invention.

Therefore, it is possible to improve a weight and/or a texture of the product by hot melt film having a thickness of 0.1 mm or less required by a shoe company or a clothing company.

As a result of applying the hydrophobic nano-silica by content as described above, the adhesion test was performed on the same fabric by thickness, and when 0.1 phr and 0.3 phr were added, the adhesive strength was somewhat unstable at 0.02 mm, however, the adhesive strength tends to be greatly improved compared to the conventional one.

On the other hand, in the case of the hydrophobic nano-silica content of 3 phr, it showed that the adhesive strength was slightly decreased as the content of the nanosilica was increased.

As a result of increasing the content, the adhesive strength was slightly decreased up to 5 phr, but there was no problem in the adhesive strength.

However, when the content of the hydrophobic nanosilica exceeds 5 phr, a slight problem occurred in the adhesive strength, it showed that the adhesive strength does not fall compared to the conventional hot melt film.

Therefore, this experimental confirmed that, as with TPU hot-melt films, if the content of hydrophobic nanosilica in the manufacture of EVA hot-melt films is 0.1 to 5.0 phr (parts per Hundred Resin) and the thickness of the film is 0.02 to 0.3 mm, the object and effect intended to be implemented in this invention can be achieved.

Experimental Example 3

In Table 4 below, a TPU hot melt film mixed with hydrophobic nanosilica having a thickness of 120 μm, 0.12 mm, prepared through a four-layer multi-press operation using a conventional T-die extruder is shown. as an example, In the multi-press work, it was confirmed that the upper and lower surfaces and the intermediate layer with less heat transfer had good adhesive strength and uniform adhesion.

This prevents the phenomenon of overflow between fabrics during the bonding process and shows that the hot melt film exhibits uniform adhesive performance without biasing to one side.

TABLE 4

| Outer material (Mesh) | Bonding strength, kgf/cm² | | | | | |
|---|---|---|---|---|---|---|
| | Lining fabric (A.NASA MM) | average | Lining fabric (B.NASA MM) | average | remark |
| Sandwich | 3.96/3.29/3.52/ 3.79/3.92/ Destruction of material | 3.7 | 3.51/3.62/3.52/ 3.56/3.55/3.54 | 3.6 | 1-layer |
| Kitten | 3.78/3.88/3.89/ 3.79/3.88/3.85 | 3.8 | 3.21/3.22/3.32/ 3.25/3.03/3.22 | 3.2 | |
| Elion | 5.14/4.96/3.32/ 5.43/5.52/3.36 | 4.6 | 3.03/3.29/3.35/ 3.34/3.48/3.32 | 3.3 | |
| CDP | 3.51/3.53/3.65/ 3.62/3.75/3.58 | 3.6 | 3.21/3.12/3.33/ 3.23/3.35/3.32 | 3.3 | |
| Sandwich | 3.55/3.68/3.65/ 4.02/4.22/3.52 | 3.8 | 3.96/3.85/3.99/ 3.45/3.00/3.17 | 3.5 | 2-layer |
| Kitten | 4.22/3.58/3.46/ 3.55/3.55/3.88 | 3.7 | 3.33/3.42/3.28/ 3.34/3.84/3.83 | 3.5 | |
| Elion | 4.33/4.81/4.44/ 3.97/3.95/4.38 | 4.3 | 3.46/3.60/3.53/ 3.50/3.33/3.10 | 3.4 | |
| CDP | 4.65/4.89/4.83/ 4.24/4.69/3.96 | 4.4 | 3.50/3.87/3.56/ 3.70/3.46/3.46 | 3.6 | |
| Sandwich | 3.61/3.43/3.15/ 3.18/3.00/3.06 | 3.2 | 3.37/3.46/3.23/ 2.93/2.68/2.68 | 3.1 | 2-layer |
| Kitten | 3.21/3.05/3.00/ 3.11/3.04/3.18 | 3.1 | 3.05/3.25/3.09/ 3.06/3.53/3.17 | 3.2 | |
| Elion | 3.05/2.97/3.08/ 3.28/3.38/3.34 | 3.2 | 2.70/2.59/3.31/ 3.24/3.33/2.97 | 3.0 | |
| CDP | 3.17/3.45/3.06/ 2.81/3.19/3.85 | 3.3 | 2.73/2.48/2.62/ 2.87/3.14/2.69 | 2.8 | |
| Sandwich | 3.75/4.63/4.35/ 4.19/4.01/3.87 | 4.1 | 3.73/3.84/3.44/ 3.55/3.79/4.29 | 3.8 | 4-layer |
| Kitten | 3.88/4.17/3.50/ 3.74/3.88/3.75 | 3.8 | 3.38/3.74/3.62/ 3.53/3.80/3.30 | 3.5 | |
| Elion | 3.78/3.11/3.76/ 3.84/3.47/3.04 | 3.5 | 3.35/3.63/3.66/ 3.45/3.36/3.3 | 3.3 | |
| CDP | 4.97/5.12/3.55/ 3.54/3.65/3.61 | 4.1 | 3.36/3.58/3.50/ 3.47/3.65/3.57 | 3.5 | |

From the experimental results of Tables 2 to 4, the hydrophobic nanosilica mixed thermoplastic hot melt film having excellent adhesion according to aspects of the present invention may be substituted, modified, and changed in various forms without departing from the technical spirit of the present invention. This is a functional adhesive film of various textile, leather and plastic products requiring uniform adhesion and durability, such as sports goods and composite fiber structures, as well as fabric areas for various shoes, clothing, bags, etc. It can be used in various applications and forms.

What is claimed is:

1. A hydrophobic nano-silica mixed thermoplastic hot melt film:
    comprising any one or more resin compositions selected from thermoplastic polyurethane (TPU) and ethylene vinyl acetate (EVA),
    wherein the resin composition comprising a nano-silica having a primary particle size of 1~100 nm and contains 0.1 to 5Parts per Hundred Resin (phr) containing a hydrophobic functional group on the surface thereof,
    wherein the nano-silica forms a nano-silica aggregate has an aggregate size of an average in a range of 100~1200 nm and a thickness of the thermoplastic hot melt film is in a range of 0.02~0.3 mm, wherein the hydrophobic functional group contained in the surface of the nano-silica particles is any one or more selected from alkyl group, dimethyl group, trimethyl group, dimethyl siloxane group, and methacryl group.

* * * * *